(12) United States Patent
Ozugur

(10) Patent No.: US 12,395,483 B2
(45) Date of Patent: Aug. 19, 2025

(54) SYSTEM AND METHOD FOR ENHANCING MULTI-FACTOR AUTHENTICATION

(71) Applicant: Bank of America Corporation, Charlotte, NC (US)

(72) Inventor: Timucin Ozugur, Fairview, TX (US)

(73) Assignee: Bank of America Corporation, Charlotte, NC (US)

( * ) Notice: Subject to any disclaimer, the term of this patent is extended or adjusted under 35 U.S.C. 154(b) by 403 days.

(21) Appl. No.: 18/045,548

(22) Filed: Oct. 11, 2022

(65) Prior Publication Data

US 2024/0121237 A1 Apr. 11, 2024

(51) Int. Cl.
*H04L 9/40* (2022.01)

(52) U.S. Cl.
CPC ...... *H04L 63/083* (2013.01); *H04L 2463/082* (2013.01)

(58) Field of Classification Search
CPC .......... H04L 63/083; H04L 2463/082
See application file for complete search history.

(56) References Cited

U.S. PATENT DOCUMENTS

| | | | |
|---|---|---|---|
| 8,571,993 B2 | 10/2013 | Kocher et al. | |
| 8,806,205 B2 | 8/2014 | Metke et al. | |
| 8,832,806 B2 | 9/2014 | Ozzie et al. | |
| 8,955,081 B2 | 2/2015 | Metke et al. | |
| 8,984,602 B1 | 3/2015 | Bailey et al. | |
| 9,135,425 B2 | 9/2015 | Yau | |
| 9,967,742 B1 | 5/2018 | Belton, Jr. et al. | |
| 9,990,625 B2 | 6/2018 | Pitroda et al. | |
| 10,057,227 B1 | 8/2018 | Hess et al. | |
| 10,187,374 B2 | 1/2019 | Brannon | |
| 10,461,939 B2 | 10/2019 | Church et al. | |
| 10,461,942 B1* | 10/2019 | Vo | H04L 9/3263 |
| 10,685,054 B2 | 6/2020 | Crouse et al. | |
| 10,754,634 B1 | 8/2020 | Falcone et al. | |
| 2010/0250290 A1 | 9/2010 | Lefkowitz et al. | |
| 2012/0124656 A1* | 5/2012 | Senac | H04L 63/0853 726/9 |
| 2013/0019018 A1 | 1/2013 | Rice | |
| 2016/0269403 A1 | 9/2016 | Koutenaei et al. | |
| 2017/0094510 A1* | 3/2017 | Khosravi | H04L 63/04 |
| 2018/0247483 A1 | 8/2018 | Lindsay | |
| 2020/0134141 A1* | 4/2020 | Ford | G06F 21/62 |
| 2020/0280839 A1* | 9/2020 | Ahmed | H04W 12/72 |

\* cited by examiner

*Primary Examiner* — Taghi T Arani
*Assistant Examiner* — Edward Estrada

(57) ABSTRACT

A system for enhancing multi-factor authentication comprises a processor associated with a server. The processor receives a first request with user identity data to access an application service from a user device. The processor generates a multi-factor authentication code to verify a user identity and a user device. The processor implements a customized operation rule with the multi-factor authentication code and a customized security code to generate an enhanced multi-factor authentication code. The processor presents the multi-factor authentication code to the user device with a response for the user to provide the enhanced multi-factor authentication code. The processor determines whether a user input code matches the enhanced multi-factor authentication code. In response to determining that the user input code matches the enhanced multi-factor authentication code, the processor authorizes the user device associated with the user to interact with the entity, such as, for example, to implement the application service.

20 Claims, 3 Drawing Sheets

SYSTEM AND METHOD FOR ENHANCING MULTI-FACTOR AUTHENTICATION

TECHNICAL FIELD

The present disclosure relates generally to network communications and network security, and more specifically to a system and method for enhancing multi-factor authentication.

BACKGROUND

There are different approaches to security authentication in mobile applications. A user may use a user device to log in to applications by enabling a "Remember Me" feature for automatic login. Even when the automatic login feature is enabled, some applications may send an access code (e.g., multi-factor authentication code) to the user device for an additional user identity authentication. However, such a conventional security authentication approach may not prevent user data leakage or loss caused by fraudulent activities using the user device to log in to the applications to access user data.

SUMMARY

Conventional technology is not configured to provide reliable and effective protection and network security solutions to prevent fraudulent access to user profiles using multi-factor authentication. The system described in the present disclosure is particularly integrated into a practical application of enhancing multi-factor authentication by generating an enhanced multi-factor authentication code with customized codes and operation rules to prevent fraudulent access to user data.

The disclosed system is configured to generate an enhanced multi-factor authentication code for improving user data security. The disclosed system may generate a multi-factor authentication code and send it to a user device to verify a user identity for determining whether to grant a user access to an application for an application service. The disclosed system may be configured to generate an enhanced multi-factor authentication code by applying a customized operation rule to the multi-factor authentication code and a customized security code. The customized security code and operation rule may be preset by the user through the user device. The enhanced multi-factor authentication code is different from the multi-factor authentication code and is stored in a memory of a server. The disclosed system is configured to send the multi-factor authentication code to the user device and require the user to provide a user input code which matches the enhanced multi-factor authentication code. The disclosed system may authorize the user device associated with the user to access the application if the user input code matches the enhanced multi-factor authentication code.

In one embodiment, the system for enhancing multi-factor authentication comprises a processor and a memory. The memory is operable to store a user profile configured to authorize a user device associated with a user to access an application service operated by an entity. The user profile comprises user identity data, a customized security code, and a customized operation rule. The processor receives a first request to access the application service from the user device. The first request comprises the user identity data. The processor generates a multi-factor authentication code configured to verify an identity of the user and the associated user device. The processor implements the customized operation rule with the multi-factor authentication code and the customized security code to generate an enhanced multi-factor authentication code. The processor presents the multi-factor authentication code to the user device with a response to the user's first request for the user to provide the enhanced multi-factor authentication code. The processor receives a user input code from the user device. The processor determines whether the user input code matches the enhanced multi-factor authentication code. In response to determining that the user input code matches the enhanced generated multi-factor authentication code, the processor authorizes the user to interact with the entity with the user device to implement the application service.

The present disclosure presents a practical application that may be implemented by the processor of the server to provide a customized layer of protection by enhancing multi-factor authentication to prevent fraudulent access to user data. The server may generate a multi-factor authentication code in response to each user request to access the application from the user device. The server may generate an enhanced multi-factor authentication code by applying the preset operation rule to the multi-factor authentication code and the customized security code. Accordingly, the server may dynamically generate a corresponding enhanced multi-factor authentication code based on a user request in real-time. Further, the customized security code and the corresponding operation rule may be dynamically updated by the user or by the system. Thus, the enhanced multi-factor authentication code may be dynamically changed based on the customized operation rule, the customized security code and the multi-factor authentication code. The enhanced multi-factor authentication code is different from the multi-factor authentication code and is not presented to the user device. The server may send the multi-factor authentication code to the user device and require the user to provide the same enhanced multi-factor authentication code to verify the user identity. The user needs to have the information of the customized operation rule and the customized security code to determine and provide the correct multi-factor authentication code to match the enhanced multi-factor authentication code. In this way, the unique enhanced multi-factor authentication code may be used to effectively prevent unauthorized or fraudulent activities of using the user device to log in to the applications to access user data.

These practical applications lead to the technical advantage of improving information security by providing an efficient and effective code encryption method. For example, the customized security code and operation rule in the user profile may be preset and updated by the user or dynamically updated by the server. The corresponding enhanced multi-factor authentication code may be dynamically changed in response to a user request in real-time. To access the application, the user requires to provide the correct enhanced multi-factor authentication code which is different from the multi-factor authentication code displayed on a use interface of the user device. This process may effectively and efficiently verify the user identity and protect user data from unauthorized access to the application and related information system through the user device. Therefore, the disclosed system minimizes or prevents unauthorized and fraudulent access to the user device. Thus, the disclosed system improves computer system security and interaction operation efficiency of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide reliable network security solutions to using multi-factor authentication for preventing fraudulent access to user data. This disclosure presents a system for enhancing multi-factor authentication for network security by referring to FIGS. 1-3.

System Overview

Figure 1:
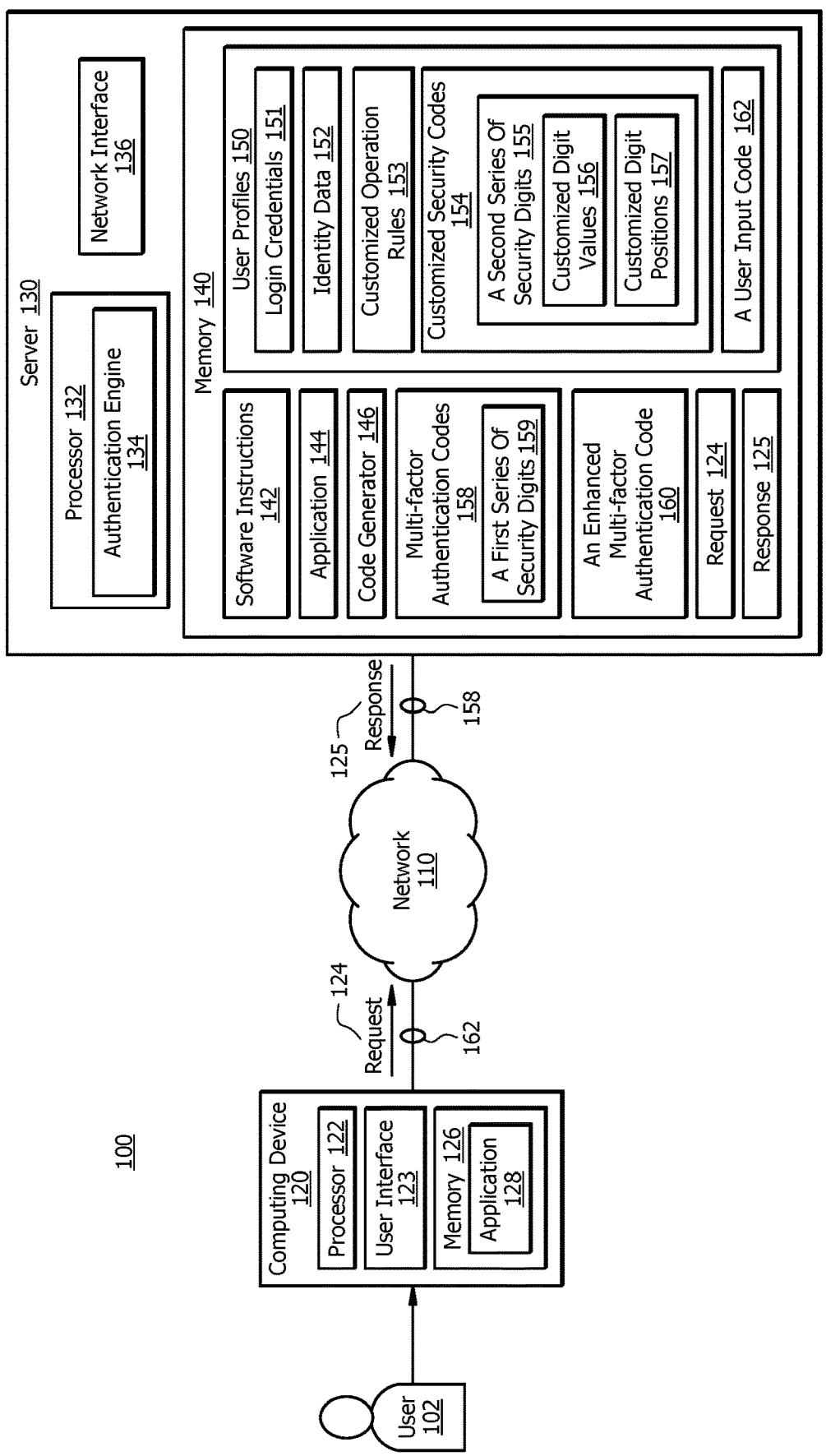
FIG. 1 illustrates an embodiment of a system configured to enhance multi-factor authentication.

FIG. 1 illustrates one embodiment of a system 100 that is configured to enhance multi-factor authentication for a computing device 120. In some embodiments, system 100 comprises a server 130, a computing device 120, and a network 110. Network 110 enables the communication between components of the system 100. Server 130 comprises a processor 132 in signal communication with a memory 140. Memory 140 stores software instructions 142 that when executed by the server 130, cause the server 130 to execute one or more functions described herein. For example, when the software instructions 142 are executed, the server 130 executes an authentication engine 134 to perform operations illustrated in FIGS. 2-3. In other embodiments, system 100 may not have all the components listed and/or may have other elements instead of, or in addition to, those listed above.

In some embodiments, the system 100 may be implemented by the server 130 to enhance multi-factor authentication by generating an enhanced multi-factor authentication code 160 to verify a user identity to access an application 144. For example, the server 130 may generate and send a multi-factor authentication code 158 to a user device 120 to verify the user identity. The server may determine the enhanced multi-factor authentication code 160 based on the multi-factor authentication code 158, a preset operation rule 153, and a customized security code 154. The user 102 provides a new multi-factor authentication code as a user input code 162 for the server 130 to determine whether it matches the enhanced multi-factor authentication code 160. If server 130 determines that the user input code 162 matches the enhanced multi-factor authentication code 160, it authorizes the user device 120 to access the application 144.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing Device

Computing device 120 is generally any device that is configured to process data and interact with a user 102. Examples of the computing device 120 (e.g., a user device) include, but are not limited to, a personal computer, a desktop computer, a workstation, a server, a laptop, a tablet computer, a mobile phone (such as a smartphone), etc. The computing device 120 may include a user interface 123, such as a display, a microphone, keypad, or other appropriate terminal equipment usable by a user 102. The computing device 120 may include a hardware processor 122, memory 126, and/or circuitry configured to perform any of the functions or actions of the computing device 120 described herein. The hardware processor 122 may include one or more processors operably coupled to the memory 126. The one or more processors 122 may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors 122 may be a programmable logic device, a microcontroller, a microprocessor, or any suitable combination of the preceding. The one or more processors 122 are configured to process data and may be implemented in hardware or software. For example, the processor may be 8-bit, 16-bit, 32-bit, 64-bit, or of any other suitable architecture. The processor 122 may include an arithmetic logic unit (ALU) for performing arithmetic and logic operations. For example, one or more software applications designed using software code may be stored in the memory 126 and executed by the processor 122 to perform the functions of the computing device 120.

In some embodiments, the computing device 120 may store and/or include an application 128. The application 128 may be a software, mobile, or web application. Application 128 may be used by the computing device 120 to access an application 144 for an application service provided by an entity through a server 130.

Server

Server 130 is generally a server, or any other device configured to process data and communicate with computing devices (e.g., computing device 120), etc., via the network 110. The server 130 is generally configured to execute the operations of the authentication engine 134, as described further below in conjunction with the operational flows of the method 200 described in FIG. 2. The server 130 may be a central server implemented in the cloud or, alternatively, it may be organized in a distributed manner.

Server 130 comprises one or more processors 132 operably coupled to the memory 140. The server 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations. The processor 132 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 142) to implement the authentication engine 134 and/or to execute one or more operations described herein with respect to server 130. In this way, the processor 132 may be a special-purpose computer designed to implement the functions disclosed herein. In one embodiment, the processor 132 is implemented using logic units, FPGAs, ASICs, DSPs, or any other suitable hardware. The processor 132 is configured to operate to perform one or more operations as described in FIGS. 2-3.

In an embodiment, the authentication engine 134 may be implemented using logic units, FPGAs, ASICs, DSPs, or any other suitable hardware. The authentication engine 134 may be configured to perform the operations as described in FIGS. 2-3. For example, the authentication engine 134 provides enhanced multifactor authentication by generating an enhanced multi-factor authentication code 160 to verify a user identity.

Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like.

The memory 140 is operable to store the software instructions 142 and/or any other data or instructions. The software instructions 142 may store any suitable set of instructions, logic, rules, or code operable to be executed by the processor 132 to implement the processes and embodiments described below. In an example operation, the memory 140 may store an application 144, a code generator 146, and other program modules which are implemented in computer-executable software instructions, such as software instructions 142. The memory 140 is operable to store user profiles 150, multi-factor authentication codes 158, an enhanced multi-factor authentication code 160, requests 124, responses 125, and user input codes 162, and/or any other data or instructions.

A user profile 150 may include user identity data 152 with login credentials 151, customized operation rules 153, and customized security codes 154. Each customized security code 154 may be preset by a user 102 and include a second series of security digits 155. The second series of security digits 155 may include one or more customized digit values 156 and one or more customized digit positions 157.

The application 144 may be associated with an organization entity that provides application services to users 102. The application 144 may be configured to create a user profile 150 with login credentials 151 for a user 102 and an associated computing device 120 to interact with the entity, such as, for example, to access application services (e.g., application 144). A server 130 associated with the application 144 may be configured to evaluate whether the user login credentials are valid based on comparing the provided login credentials with login credentials 151 previously set by the user 102 and stored in a memory 140. The user 102 may operate the user device 120 by enabling a "Remember Me" feature of the application 144 for automatic login. In conjunction with validating the login credentials, the code generator 146 may be implemented by the authentication engine 134 executed by the processor 132 to generate a multi-factor authentication code 158 to verify the user identity and the associated user device 120 as described in operations illustrated in FIGS. 2-3. Once the user identity is verified, the user 102 may access the application 144 for an application service.

Network interface 136 is configured to enable wired and/or wireless communications (e.g., via network 110). The network interface 136 is configured to communicate data between the server 130 and other devices (e.g., computing device 120), databases, systems, or domains. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Authentication Engine

The authentication engine 134 may be implemented by the processor 132 by executing the software instructions 142 to determine whether to verify or authorize a user 102 and an associated user device 120 to access an application 144 for an application service. The authentication engine 134 may operate a code generator 146 to generate a multi-factor authentication code 158 in response to a user request 124 to access the application 144. In some embodiments, the authentication engine 134 may operate an enhanced multi-factor authentication code 160 by applying a customized operation rule 153 to the multi-factor authentication code 158 and a customized security code 154. The authentication engine 134 may authorize the user device 120 to access the application 144 if a user input code 162 received by the server 130 matches the enhanced multi-factor authentication code 160. The operation of the disclosed system 100 is described below.

Generate an Enhanced Multi-Factor Authentication Code

This process may be implemented by the server 130 to generate an enhanced multi-factor authentication code 160 based on a multi-factor authentication code 158, a customized operation rule 153, and a customized security code 154. Code generator 146 may be implemented by the processor 132 executing the software instructions 142 to generate a multi-factor authentication codes 158. The server 130 may generate different multi-factor authentication codes 158 in response to each request 124 from the user device 120 to access the application 144. A multi-factor authentication code 158 may be a n-digit-token which includes a first series of security digits 159 ($A_{11}, A_{12}, \ldots A_{1n}$).

| | | | | | | |
|---|---|---|---|---|---|---|
| An example multi-factor authentication code 158 (A first series of security digits 159) | $A_{11}$ (6) | $A_{12}$ (2) | $A_{13}$ (5) | $A_{14}$ (7) | $A_{15}$ (1) | $A_{16}$ (3) |
| An example customized Security Codes 154 (A second series of security digits 155) | $B_{21}$ – | $B_{22}$ (1) | $B_{23}$ – | $B_{24}$ (6) | $B_{25}$ – | $B_{26}$ – |
| An example operation rule (R) | | + | | + | + | |
| An enhanced multi-factor authentication code 160 | $C_{11}$ (6) | $C_{12}$ (3) | $C_{13}$ (6) | $C_{14}$ (3) | $C_{15}$ (1) | $C_{16}$ (3) |

Table 1

As illustrated table 1, an example multi-factor authentication code 158 may be a 6-digit-token which includes a first series of security digits 159 ($A_{11}$, $A_{12}$, . . . $A_{16}$). Each security digit is associated with a unique digit position. An example customized security code 154 may be a second series of security digits 155. The second series of security digits 155 includes one or more customized digit values 156 and one or more customized digit positions 157. An example customized security code 154 may include two security digits $B_{22}$ and $B_{24}$ in the second series of security digits 155 (-, $B_{22}$, -, $B_{24}$, -, -). Each digit value 156 in the second series of the security digits 155 has a corresponding customized digit position 157. The customized digit position 157 matches a corresponding digit position in the first series of security digits 159 of the multi-factor authentication code 158. The example customized digit positions 157 associated with the security digits $B_{22}$ and $B_{24}$ correspond to the digit positions which are associated with the first series of security digits 159 (e.g., $A_{12}$ and $A_{14}$) of the multi-factor authentication code 158.

In some embodiments, the customized operation rule 153 may be an operation rule (R) which is configured to determine one or more new security digits of an enhanced multi-factor authentication code 160 based on the first series of security digits 159 and the second series of security digits 155. In one embodiment, an example customized operation rule 153 may be an addition operation which is applied to the first series of security digits 159 and the second series of security digits 155 at each corresponding position to generate an enhanced multi-factor authentication code 160 ($C_{11}$, $C_{12}$, $C_{16}$).

As illustrated in table 1, the enhanced security digit values ($C_{12}$ and $C_{14}$) may be determined by adding the digit values ($A_{12}$ and $A_{14}$) of the multi-factor authentication codes 158 and the customized digits values ($B_{22}$ and $B_{24}$) of the customized security codes 154. For example, in response to receiving a request 124 from the user device 120, the code generator 146 may generate a multi-factor authentication code 158 as a 6-digit-token "625713". The user 102 may preset a customized security code 154 as a second series of security digits 155 (-, 1, -, 6, -, -). Each customized digit position 157 at $B_{22}$ or $B_{24}$ matches a corresponding digit position in the first series of security digits 159 of the multi-factor authentication code 158.

The server 130 may generate an enhanced multi-factor authentication code 160 as "636313" which is different from the 6-digit-token "625713" of the multi-factor authentication code 158. Each of the digit values of $C_{12}$ and $C_{14}$ in the enhanced multi-factor authentication code 160 may be one's digits based on the corresponding operation result. If the operation result $C_{14}$ (e.g., "13") is larger than 10, the operation result $C_{14}$ in ten's place has a value of "1". As illustrated in the table 1, the value of "1" determined at the digit position $C_{14}$ may be added to the digit value of "5" of $A_{13}$ on the left side of the digit position of $A_{14}$ to generate a new digit value of "6" of $C_{13}$.

In response to receiving the 6-digit-token "625713" of the multi-factor authentication code 158 via a response 125, the user 102 may determine and provide a user input code 162 by applying a customized operation rule 153 to the multi-factor authentication code 158 and the customized security code 154. The server 130 may receive a user input code 162 and compare it with the enhanced multi-factor authentication code 160. As illustrated in table 1, if the user input code is "636313," the server 130 determines that the user input code 162 matches the enhanced multi-factor authentication code 160. In response, the server 130 authorizes the user device 120 to interact with the entity, such as, for example, to access application services (e.g., application 144).

In some embodiments, the system allows the user 102 to preset the customized digit values 156 and customized digit positions 157. In one embodiment, the system allows the user device 120 to access the user profile 150 to update the customized security code 154. The user 102 may change or switch one or more of corresponding digit positions 157 of the customized digit values 156 in the user profile 150. The user 102 may change or switch the positions or the values of security digits $B_{22}$ and $B_{24}$ of the customized security code 154 to the digit positions at $B_{25}$ and $B_{26}$. For example, the customized security code 154 may be modified to be a different, second series of security digits 155 (-, -, -, -, 1, 6). For the same 6-digit-token "625713" of the multi-factor authentication code 158, the server 130 may generate a new enhanced multi-factor authentication code 160 which is "625729" based on the example operation rule (R). When the user device 120 receives the 6-digit-token "625713", the user 102 is required to provide the new multi-factor authentication code of "625729" as a user input code 162 through the user device 120 in order to be verified.

In some embodiments, the user 102 may add at least one new security digit to or remove at least one security digit from the second series of the security digits 155. In some embodiments, the system may dynamically adjust the customized digit values 156 and the corresponding customized digit positions 157. For example, the system may provide different operation rules for the user 102 to select. The operation rules may involve a number of different operations, including but not limited to addition, subtraction, and multiplication. The system may dynamically provide options for the user to update the customized security code 154 by changing one or more customized digit values 156 and the corresponding customized digit positions 157. For example, the user 102 may access the server 130 via the user device 120 to update a present customized security code 154 (-, 1, -, 6, -, -) to a new customized security code 154 (-, 2, -, 6, -, -) with a digit value 156 changed at the second digit position 157 at $B_{22}$. In another example, the user 102 may access the server 130 via the user device 120 to update the customized security code 154 (-, 1, -, 6, -, -) to a new customized security code 154 (-, -, -, -, 2, 5) by changing the digit values 156 and digit positions 157 to the fifth and sixth digit positions at $B_{25}$ and $B_{26}$. The operation of the disclosed system 100 is described below.

Example Operational Flow for Enhancing Multi-Factor Authentication

Figure 2:
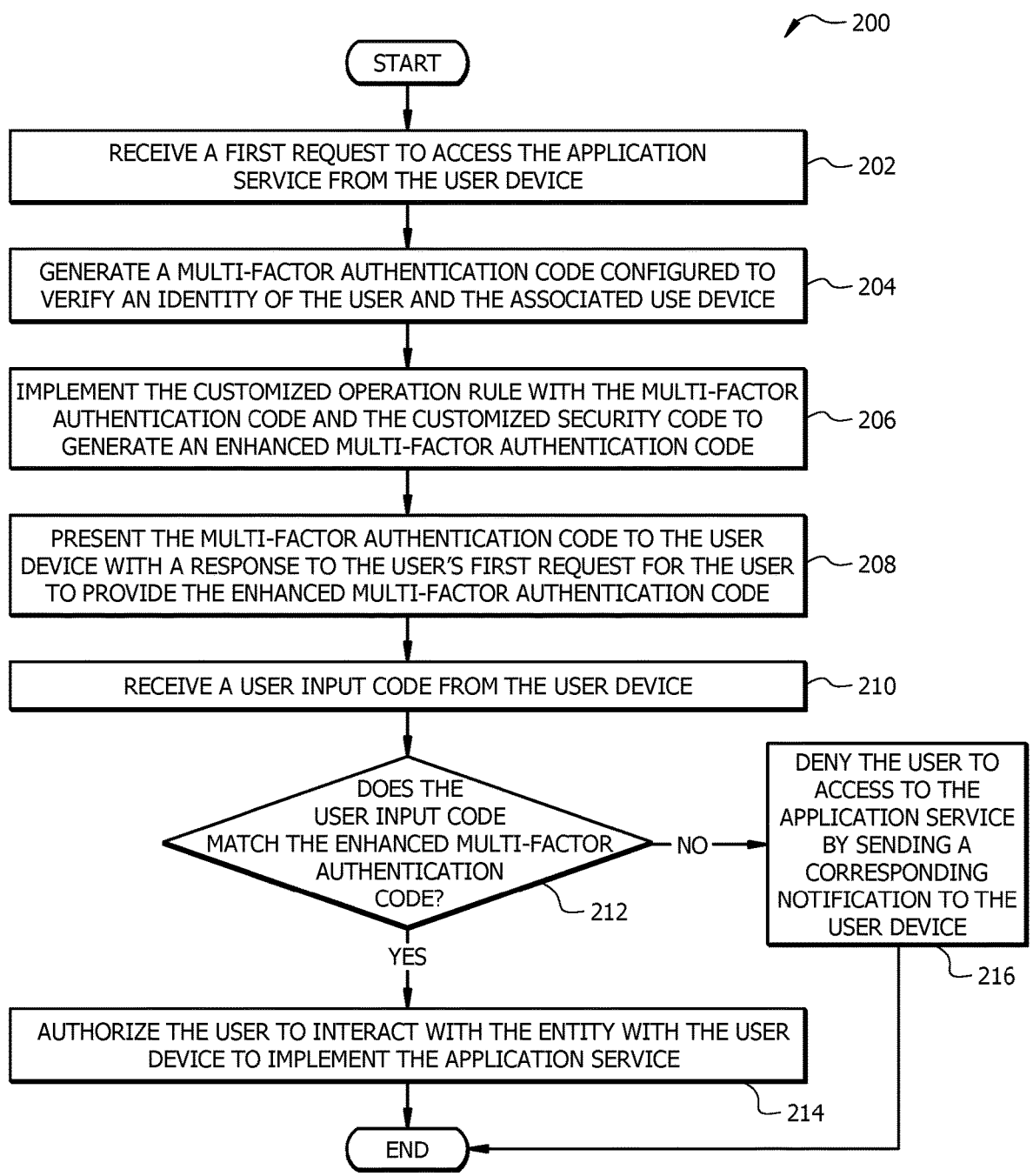
FIG. 2 illustrates an example operational flow of a method for enhancing multi-factor authentication.

FIG. 2 illustrates an example flow of a method 200 for enhancing multi-factor authentication in the system 100. Modifications, additions, or omissions may be made to method 200. Method 200 may include more, fewer, or other operations. For example, operations may be performed by the server 130 in parallel or in any suitable order. While at times discussed as the system 100, processor 132, authentication engine 134, code generator 146 or components of any of thereof performing operations, any suitable system or components of the system may perform one or more operations of the method 200. For example, one or more operations of method 200 may be implemented, at least in part, in the form of software instructions 142 of FIG. 1, stored on non-transitory, tangible, machine-readable media (e.g., memory 140 of FIG. 1) that when run by one or more processors (e.g., processor 132 of FIG. 1) may cause the one or more processors to perform operations 202-216.

The method 200 begins at operation 202 where the server 130 receives a first request 124 to access an application 144 from the user device 120. The first request 124 comprises the user identity data 152 from a user profile 150. The user identity data 152 may include one or more user login credentials which are used for the server 130 to verify the user identity.

At operation 204, the server 130 generates a multi-factor authentication code 158 configured to verify the identity of the user 102 and the associated user device 120. The multi-factor authentication code 158 is generated to be a n-digit-token which comprises a first series of security digits 159. Each security digit is associated with a unique digit position.

At operation 206, the server 130 implements the customized operation rule 153 with the multi-factor authentication code 158 and the customized security code 154 to generate an enhanced multi-factor authentication code 160. The server 130 may store the enhanced multi-factor authentication code 160 in the memory 140. For example, the server 130 may implement a customized operation rule 153 by adding the first series of the security digits 159 and the second series of the security digits 155 at corresponding digit positions of customized digit positions 157 to generate the enhanced multi-factor authentication code 160. The server 130 stores the enhanced multi-factor authentication code 160 in the memory 140. The enhanced multi-factor authentication code 160 is different from the multi-factor authentication code 158 and is not presented to the user device 120.

At operation 208, the server 130 presents the multi-factor authentication code 158 to the user device 120 with a response 125 to the user's first request 124 for the user 102 to provide the enhanced multi-factor authentication code 160 though a user interface 123 of the user device 120.

At operation 210, the server 130 receives a user input code 162 from the user device 120 for providing the enhanced multi-factor authentication code 160.

At operation 212, the server 130 determines whether the user input code 162 matches the enhanced multi-factor authentication code 160 stored in the memory 140.

At operation 214, in response to determining that the user input code 162 matches the enhanced multi-factor authentication code 160 stored in the memory 140, the server 130 authorizes the user 102 and the user device 120 to interact with the entity to implement the application service.

At operation 216, in response to determining that the user input code 162 does not match the enhanced multi-factor authentication code 160, the server 130 may deny a user access to the application service. For example, the server 130 may generate and send a corresponding notification to the user device 120 to notify the user.

Figure 3:
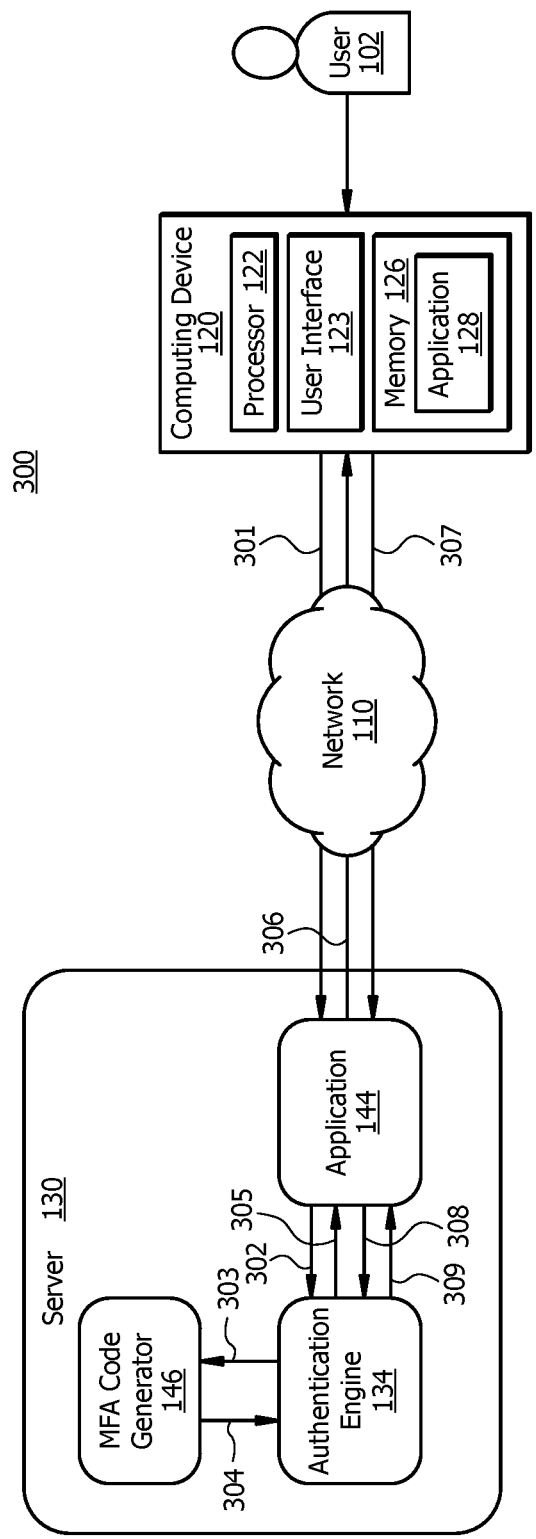
FIG. 3 illustrates an operational flow of an example practical application in conjunction with the system of FIG. 1 and the method of FIG. 2.

FIG. 3 illustrates an operational flow 300 of an example practical application in conjunction with the system 100 of FIG. 1 and the method 200 of FIG. 2. For example, the server 130 may verify a user identity for a user 102 and the associated user device 120. In one embodiment, this permits user 102 to access an application 144 and to transfer a digital item to another entity.

At 301, the user 102 may operate the user device 120 to send a request 124 to log in to an application 144 with identity data 152 through a browser application 128. The application 144 is configured to verify the user identity using the identity data 152 of the user profile 150. The application 144 is further configured to verify the user's identity via an authentication code even though the user enables "Remember Me" feature for the application 144 to remember the user identity data 152 for automatic login.

At 302, the application 144 may request the authentication engine 134 of the server 130 to generate a multi-factor authentication code 160 to verify the user identity.

At 303, the server 130 may execute a code generator 146 to receive the request for generating the multi-factor authentication code 160.

At 304, the server 130 may execute the code generator 146 to generate the multi-factor authentication code 158 and send the code to the authentication engine 134. The server 130 may generate an enhanced multi-factor authentication code 160 based on the multi-factor authentication code 158 and store it in the memory 140. As described above, the server 130 may determine the enhanced multi-factor authentication code 160 by applying the customized operation rule 153 to the multi-factor authentication code 158, and the customized security code 154. The customized security code 154 includes one or more customized digit values 156 and customized digit positions 157. The server 130 stored the enhanced multi-factor authentication code 160 in the memory 140. The server 130 does not present the enhanced multi-factor authentication code 160 to the user 102 on the user interface 123 of the user device 120.

At 305, the authentication engine 134 may be implemented by the processor 132 by executing the software instructions 142 to send the multi-factor authentication code 158 to the application 144.

At 306, the server 130 may execute the application 144 to send the multi-factor authentication code 158 to the user device 120 via a text message to verify the user identity. For example, the text message may be an instant message or an email. The server 130 may request the user 102 to enter a user input code 162 for verifying the user identity.

At 307, in response to receiving the multi-factor authentication code 158 from the server 130, the user 102 is required to provide a user input code 162 to match the enhanced multi-factor authentication code 160 determined by the server 130. For example, the user input code 162 may be a new calculated multi-factor authentication code which is different from the multi-factor authentication code 158. The new calculated multi-factor authentication code may be determined by the user 102 by applying the customized operation rules 153 to the multi-factor authentication code 158, customized digit values 156, and customized digit position 157. The customized digit values 156 and customized digit position 157 are previously set by the user 102. The user device 120 receives the user input code 162 from the user 102 and sends the user input code 162 to the server 130 through the application 144.

At 308, the server 130 may execute the application 144 to send the received user input code 162 to the authentication engine 134 to verify the user identity.

At 309, the authentication engine 134 may be implemented by the processor 132 by executing the software instructions 142 to compare the enhanced multi-factor authentication code 160 stored in the memory 140 to the user input code 162 to verify the user identity. If the user input code 162 matches the enhanced multi-factor authentication code 160, the serve 130 may authorize the user device 120 to access the application 144 for the application service. Otherwise, the serve 130 may deny the request to access the application 144 by sending a corresponding notification to the user device 120.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
a user profile configured to authorize a user device associated with a user to access an application service operated by an entity, wherein the user profile comprises user identity data, a customized security code, and a customized operation rule; and
a processor operably coupled to the memory, the processor configured to:
receive a first request to access the application service from the user device, wherein the first request comprises the user identity data;
generate a multi-factor authentication code configured to verify an identity of the user and the associated user device;
generate an enhanced multi-factor authentication code from the multi-factor authentication and the customized security code in conjunction with a customized operation rule, wherein the enhanced multi-factor authentication code is different from the multi-factor authentication code;
present the multi-factor authentication code to the user device with a response to the user's first request for the user to provide the enhanced multi-factor authentication code;
receive a user input code from the user device;
determine whether the user input code matches the enhanced multi-factor authentication code; and
in response to determining that the user input code matches the enhanced multi-factor authentication code, authorize the user to interact with the entity with the user device to implement the application service.

2. The system of claim 1, wherein the multi-factor authentication code is generated to be a n-digit-token which comprises a first series of security digits, each security digit being associated with a unique digit position.

3. The system of claim 2, wherein:
the customized security code comprises a second series of security digits;
each digit in the second series of the security digits has a customized digit position; and
the customized digit position matches a corresponding digit position in the first series of the security digits of the multi-factor authentication code.

4. The system of claim 3, wherein the processor is further configured to:
allow the user device to access the user profile to update the customized operation rule;
implement the customized operation rule by adding the first series of the security digits and the second series of the security digits at each corresponding position to generate the enhanced multi-factor authentication code; and
store the enhanced multi-factor authentication code in the memory.

5. The system of claim 3, wherein the processor is further configured to allow the user device to access the user profile to update the customized security code by changing or switching one or more of corresponding digit positions of the security digits in the second series of the security digits.

6. The system of claim 3, wherein the processor is further configured to allow the user device to access the user profile to update the customized security code by changing one or more corresponding values of the security digits in the second series of the security digits.

7. The system of claim 1, wherein the processor is further configured to, in response to determining that the user input code does not match the enhanced multi-factor authentication code:
deny a user access to the application service by sending a corresponding notification to the user device.

8. A method comprising:
receiving a first request to access an application service from a user device, wherein the application service is operated by an entity and the first request comprises user identity data;
generating a multi-factor authentication code configured to verify an identity of a user and the user device;
generating an enhanced multi-factor authentication code from the multi-factor authentication and the customized security code in conjunction with a customized operation rule, wherein the enhanced multi-factor authentication code is different from the multi-factor authentication code;
presenting the multi-factor authentication code to the user device with a response to the user's first request for the user to provide the enhanced multi-factor authentication code;
receiving a user input code from the user device;
determining whether the user input code matches the enhanced multi-factor authentication code; and
in response to determining that the user input code matches the enhanced generated multi-factor authentication code, authorizing the user to interact with the entity with the user device to implement the application service.

9. The method of claim 8, wherein the multi-factor authentication code is generated to be a n-digit-token which comprises a first series of security digits, each security digit being associated with a unique digit position.

10. The method of claim 9, wherein:
the customized security code comprises a second series of security digits;
each digit in the second series of the security digits has a customized digit position; and
the customized digit position matches a corresponding digit position in the first series of the security digits of the multi-factor authentication code.

11. The method of claim 10, further comprising:
allowing the user device to access a user profile to update the customized operation rule;

implementing the customized operation rule by adding the first series of the security digits and the second series of the security digits at each corresponding position to generate the enhanced multi-factor authentication code; and storing the enhanced multi-factor authentication code.

12. Method of claim 10, further comprising allowing the user device to access the user profile to update the customized security code by changing or switching one or more of corresponding digit positions of the security digits in the second series of the security digits.

13. The method of claim 10, further comprising allowing the user device to access the user profile to update the customized security code by changing one or more corresponding values of the security digits in the second series of the security digits.

14. The method of claim 8, further comprising, in response to determining that the user input code does not match the enhanced multi-factor authentication code, denying a user access to the application service by sending a corresponding notification to the user device.

15. A non-transitory computer-readable medium that stores instructions, wherein when the instructions are executed by one or more processors, cause the one or more processors to:

receive a first request to access an application service from a user device, wherein the application service is operated by an entity and the first request comprises a user identity data;

generate a multi-factor authentication code configured to verify an identity of a user and the user device;

generate an enhanced multi-factor authentication code from the multi-factor authentication and the customized security code in conjunction with a customized operation rule, wherein the enhanced multi-factor authentication code is different from the multi-factor authentication code;

present the multi-factor authentication code to the user device with a response to the user's first request for the user to provide the enhanced multi-factor authentication code;

receive a user input code from the user device;

determine whether the user input code matches the enhanced multi-factor authentication code; and in response to determining that the user input code matches the enhanced generated multi-factor authentication code, authorize the user to interact with the entity with the user device to implement the application service.

16. The non-transitory computer-readable medium of claim 15, wherein the instructions further cause the one or more processors to:

in response to determining that the user input code does not match the enhanced multi-factor authentication code, deny a user access to the application service by sending a corresponding notification to the user device; and wherein the multi-factor authentication code is generated to be a n-digit-token which comprises a first series of security digits, each security digit being associated with a unique digit position.

17. The non-transitory computer-readable medium of claim 16, wherein:

the customized security code comprises a second series of security digits;

each digit in the second series of the security digits has a customized digit position; and the customized digit position matches a corresponding digit position in the first series of the security digits of the multi-factor authentication code.

18. The non-transitory computer-readable medium of claim 17, wherein the instructions when executed by the processor further cause the one or more processors to:

allow the user device to access a user profile to update the customized operation rule;

implement the customized operation rule by adding the first series of the security digits and the second series of the security digits at each corresponding position to generate the enhanced multi-factor authentication code; and store the enhanced multi-factor authentication code.

19. The non-transitory computer-readable medium of claim 17, wherein the instructions further cause the one or more processors to allow the user device to access the user profile to update the customized security code by changing or switching one or more of corresponding digit positions of the security digits in the second series of the security digits.

20. The non-transitory computer-readable medium of claim 17, wherein the instructions further cause the one or more processors to allow the user device to access the user profile to update the customized security code by changing one or more corresponding values of the security digits in the second series of the security digits.

* * * * *